UNITED STATES PATENT OFFICE.

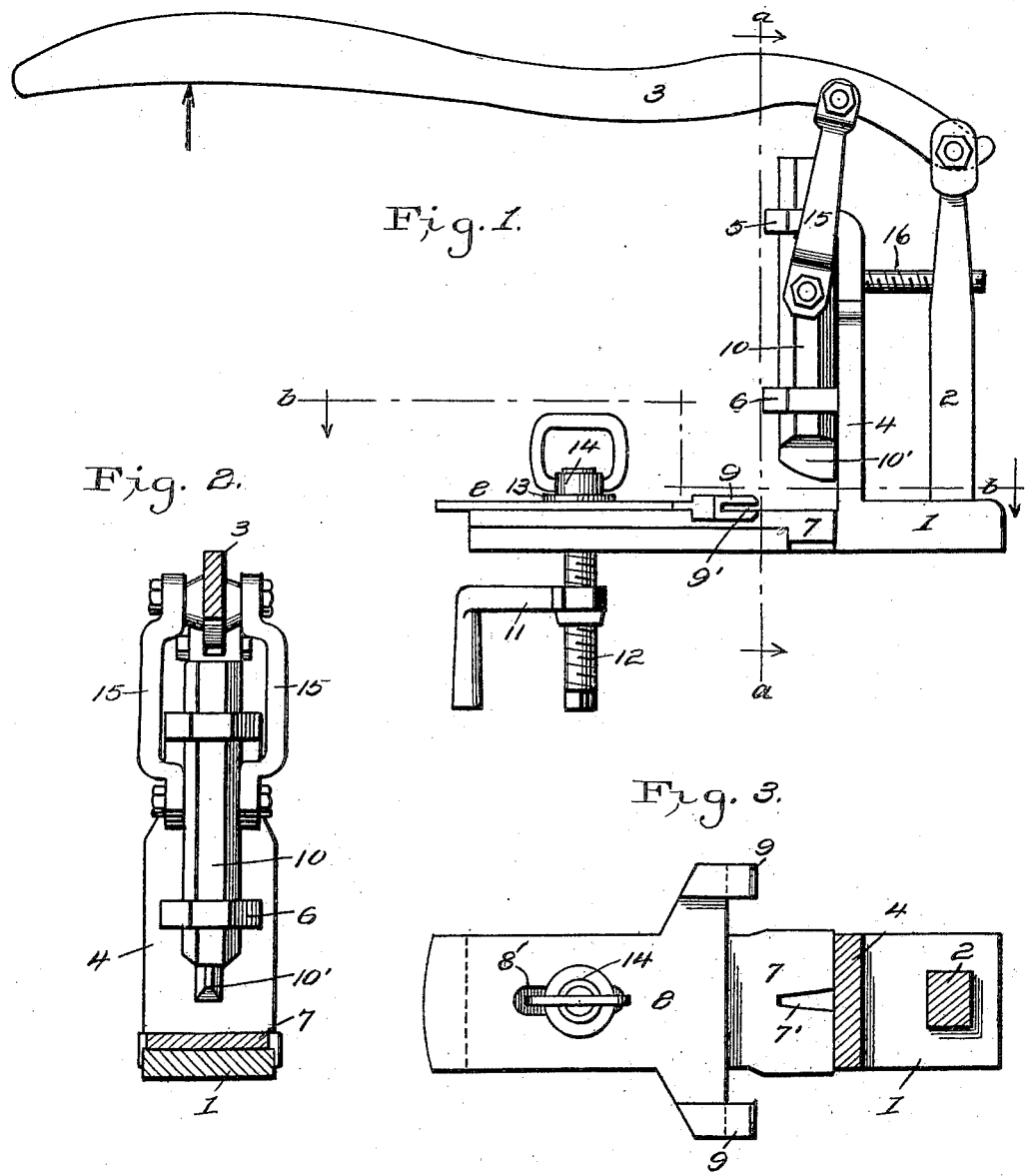

KALLE RINNE, OF NORWOOD, MASSACHUSETTS.

SAW-SET.

1,397,331.  Specification of Letters Patent.  Patented Nov. 15, 1921.

Application filed October 2, 1920. Serial No. 414,267.

*To all whom it may concern:*

Be it known that I, KALLE RINNE, a citizen of the United States, residing at Norwood, in the county of Norfolk and State of Massachusetts, have invented certain new and useful Improvements in a Saw-Set, of which the following is a specification.

My invention relates to apparatus for setting the teeth of saws, and has for one of its objects to provide means for expeditiously setting saws with accuracy and precision.

Another object of my invention is to provide an efficient apparatus, for the purpose stated, at a low cost.

In the accompanying drawing:

Figure 1 represents a side view of the apparatus,

Fig. 2 is a vertical section on the line a—a of Fig. 1, and

Fig. 3 is a horizontal section on the line b—b of Fig. 1.

1 designates a base plate provided with a standard 2 to the upper end of which an operating hand lever 3 is pivoted.

The base 1 is provided with clamping means 11 and 12 by which it is secured on a suitable bench, shelf, or other support. On the base 1 is secured a plate 7, and on the plate 7 is a second plate 8 having spaced sawholding jaws 9—9, said plate being slotted, as at 8' to receive the upper end of the clamping screw 12, whereby it is adapted to be moved and adjusted to receive and hold saws of different widths, said plate, together with plate 9 being clamped and held by a clamping nut 14 fitted on the end of screw 12.

4 designates a second standard, shown as of the same width as the base, and carrying guides 5, 6 in which the vertically movable setting plunger reciprocates, said plunger being operated by a lever handle 3 pivoted in the top of standard 2 and connected to the plunger by links 15—15.

The jaws 9—9 have saw holding slots or kerfs 9' which receive the back edge of the saw blade and hold the blade in horizontal position on, and extending across the plate 7.

The plate 7 has a notch or opening 7' over which the saw teeth pass as the saw is moved transversely through the jaws 9—9. The plunger 10 has at its lower end a flat projection 10' adapted to pass into said opening, and of shape and size in transverse section to correspond with the shape of the saw teeth to be operated on, and its lower end is inclined or beveled, as shown in Fig. 1, so that the point of the saw tooth will be pressed down beyond the base thereof. The plunger and the notch 7' are so disposed relatively to each other that the short edge of the projection 10' will move in the vertical plane of the rear end of the notch, whereby the base of the saw tooth operated on will, by being interposed between said short edge and the end of notch, serve as a stop to arrest the downward movement of the plunger, so that all the teeth will be bent down to the same extent.

In operation the back of the saw blade is inserted into the slots or kerfs 9' of the holding jaws 9 and the plate 8 is adjusted so that when the saw is moved through the jaws the teeth thereof will pass over the opening 7', then the blade is moved step-by-step to bring alternate teeth successively over the notch 7' and after each movement the lever 3 is depressed to operate the plunger 10 to set the tooth then in position, as above explained. The blade is then taken out and reversed, that is, turned end-for-end, and the operation repeated to set the remaining teeth on the other side.

The horizontal screw 16, shown in Fig. 1, connects the two standards 2 and 4 and increases the rigidity of the apparatus.

Any changes or modifications falling within the scope of the appended claim is to be considered as belonging to my invention. It will be understood that the plate 7 may be integral with the base 1.

I claim as my invention:

A saw setting device comprising a base plate having a pair of spaced, vertical standards, a lever pivoted to one of said standards, a setting plunger having a flat projecting end and links connecting said plunger to the lever, guides on the second standard for said plunger, an apertured bottom plate disposed on the base plate beneath the plunger, a horizontally adjustable saw retaining plate superposed on the apertured plate whereby the teeth of a saw may be engaged by the projecting end of the plunger operable through the aperture in the bottom plate and means for clamping said base plate and superposed plates to a support.

In testimony whereof, I affix my signature hereto.

KALLE RINNE.